(12) United States Patent
Kraemer

(10) Patent No.: US 7,012,615 B2
(45) Date of Patent: Mar. 14, 2006

(54) USING POLYNOMIAL TEXTURE MAPS FOR MICRO-SCALE OCCLUSIONS

(75) Inventor: Manuel Kraemer, Emeryville, CA (US)

(73) Assignee: Pixar, Emeryville, CA (US)

( * ) Notice: Subject to any disclaimer, the term of this patent is extended or adjusted under 35 U.S.C. 154(b) by 192 days.

(21) Appl. No.: 10/778,582

(22) Filed: Feb. 12, 2004

(65) Prior Publication Data

US 2005/0190194 A1    Sep. 1, 2005

(51) Int. Cl.
*G09G 5/00*    (2006.01)
(52) U.S. Cl. ................... 345/582; 345/421; 345/426; 345/586
(58) Field of Classification Search ................ 345/421, 345/426, 582, 586; 352/75; 382/174
See application file for complete search history.

(56) References Cited

U.S. PATENT DOCUMENTS

| 6,252,608 | B1 | 6/2001 | Snyder et al. |
| 6,515,674 | B1 | 2/2003 | Gelb et al. |
| 6,583,790 | B1 | 6/2003 | Wolters |
| 6,654,013 | B1 | 11/2003 | Malzbender et al. |

OTHER PUBLICATIONS

Malzbender et al., "Polynomial Texture Maps" Hewlett Packard Laboratories. pp. 1-6.*
Malzbender et al., Hewlett Packard Laboratories, "Polynomial Texture Maps", <<http://www.hpl.hp.com/personal/Tom_Malzbender/papers/ptm.pdf>> pp. 1-10. (Copyright May 2001).*
Adabala et al., "Real-Time Rendering of Woven Clothes" *VRST '03*, (Oct. 1-3, 2003), Osaka, Japan, pp. 41-47.
Malzbender et al., Hewlett Packard Laboratories, "Polynomial Texture Maps", <<http://www.hpl.hp.com/personal/Tom_Malzbender/papers/ptm.pdf>> pp. 1-10. (Copyright May 2001).
Malzbender et al., "Polynomial Texture Map (.ptm) File Format", Version 1.2, Client and Media Systems Laboratory, Hewlett Packard Laboratories, Palo Alto, (2001), 7 pages total.
Malzbender et al., "Polynomial Texture Maps" Hewlett Packard Laboratories, pp. 1-6.
Mohr, "Polynomial Texture Maps, CS 766 Homework 5", (2001), 11 pages total.
Xu et al., "Photorealistic Rendering of Knitwear", *ACM SIGGRAPH 2001*, (Aug. 12-17, 2001), pp. 391-398.

* cited by examiner

*Primary Examiner*—Matthew C. Bella
*Assistant Examiner*—G. F. Cunningham
(74) *Attorney, Agent, or Firm*—Townsend and Townsend and Crew LLP

(57) ABSTRACT

Techniques for using a polynomial texture map (PTM) to encode micro-occlusions information. The micro-occlusions information stored in the PTM is then used to display micro-occlusions cast on a surface by surface geometries or other geometries under various irradiance conditions.

27 Claims, 5 Drawing Sheets

USING POLYNOMIAL TEXTURE MAPS FOR MICRO-SCALE OCCLUSIONS

BACKGROUND OF THE INVENTION

The present invention relates to the field of computer graphics imaging, and more particularly to techniques for efficiently representing micro-scale occlusions.

In computer graphics, the process of generating a 2-dimensional image from a 3-dimensional scene comprising one or more objects from a given viewpoint is referred to as rendering. Animated sequences can then be created by rendering a sequence of images as the scene is gradually changed over time. A great deal of time and effort is being devoted towards improving the photo-realism of rendered images. This includes providing graphic systems with the ability to render objects of different types, various textures, reflections, shadows, etc.

The depiction of shadows in rendered images goes a long way in enhancing the realism of a 2-dimensional image. Shadows help to give a 2-dimensional image the look and feel of 3-dimensions. Accordingly, an important component of any graphics system is its ability to determine shadows cast by objects in a scene and to store the shadow information such that it can be used for rendering the 2-dimensional image.

A shadow is cast by occlusion of light by an object or opaque surface. An object can cast a shadow on another object or onto itself (self-shadow). Accordingly, in order to determine shadow information for a scene, a graphics system determines occlusions that occur in the scene. An occlusion occurs when an opaque surface casts a shadow on another surface from the perspective of the light source. For example, an object closer to the light source can cast a shadow on other objects that are further away from the light source in the scene. A surface geometry of one object may occlude another surface of the same object or a different object.

Various techniques are presently used for determining occlusion information. These include Z-buffering techniques, ray-tracing, and others. Various techniques are also used for storing the shadow information. For example, in techniques using z-maps or shadow maps, a shadow map stores shadow depth values that are used by the graphics system to determine which portions of a surface are in shadow during the rendering process. In techniques using ray tracing, a "light feeler" ray is sent out from a shaded point to determine if it hits something on its way to the light source.

The existing techniques of determining occlusions and storing the occlusions information are however not suitable for occlusions that occur on a micro-scale, for example, occlusions that occur at a scale of a few pixels (e.g., less than 3×3 pixels). Such micro-occlusions can be caused, for example, by a weave pattern on a cloth or fabric, by fibers of a material such as wool, velvet, etc., by fur particles, by grass blades, by hair strands, by "fuzzy" materials, knitwear material, and other structures that have fine divots and grooves that are too small to be represented accurately by either a shadow map or a ray-tracing technique. In the past, such micro-scale occlusions were ignored by graphics systems. Alternatively, extremely high resolution shadow maps were used to represent the micro-scale occlusions. These high resolution shadow maps however require extensive memory and processing resources for storage and computations of the shadow maps. As a result, the use of high resolution shadow maps for representing micro-occlusions is very prone to aliasing artifacts, resource expensive, and often impractical if feasible at all.

Improved techniques are thus needed for representing micro-occlusions that are more efficient than conventional techniques.

BRIEF SUMMARY OF THE INVENTION

Embodiments of the present invention provide techniques for using a polynomial texture map (PTM) to encode micro-occlusions information. The occlusion PTM is then used during the rendering process to display micro-occlusions.

According to an embodiment of the present invention, techniques are provided for storing a texture map encoding micro-occlusions information for a surface. A plurality of sets of values is determined for the surface. Each set of values in the plurality including values corresponding to coefficients of a polynomial function that yields an occlusion value based upon a light direction. The plurality of sets of values encodes information for micro-occlusions for the surface under varying irradiance conditions. The plurality of sets of values is then stored as a texture map.

According to an embodiment of the present invention, information is received identifying a light source direction. An occlusion value is determined for each set of values in the plurality of sets of values of the texture map, the occlusion value for each set of values determined based upon the values in the set of values and the light source direction. An image is displayed based upon the determined occlusion values for the plurality of sets of values in the texture map.

The foregoing, together with other features, embodiments, and advantages of the present invention, will become more apparent when referring to the following specification, claims, and accompanying drawings.

DETAILED DESCRIPTION OF THE INVENTION

In the following description, for the purposes of explanation, specific details are set forth in order to provide a thorough understanding of the invention. However, it will be apparent that the invention may be practiced without these specific details.

Embodiments of the present invention provide techniques for representing micro-occlusions in an efficient manner.

Micro-occlusions (or micro-scale occlusions) are occlusions of light sources that are caused by geometries having a small scale and generally a high frequency. Examples include occlusions caused by small groves, weave patterns, fuzzy materials, etc. Due to the small scale and high frequencies of the geometries, micro-occlusions caused by such geometries cannot be sampled efficiently using traditional shadowing techniques such as ray-tracing, z-maps, deep z-maps, etc. Each micro-occlusion is generally no more than the size of a few pixels (e.g., 5×5) once projected and rendered.

Figure 1:
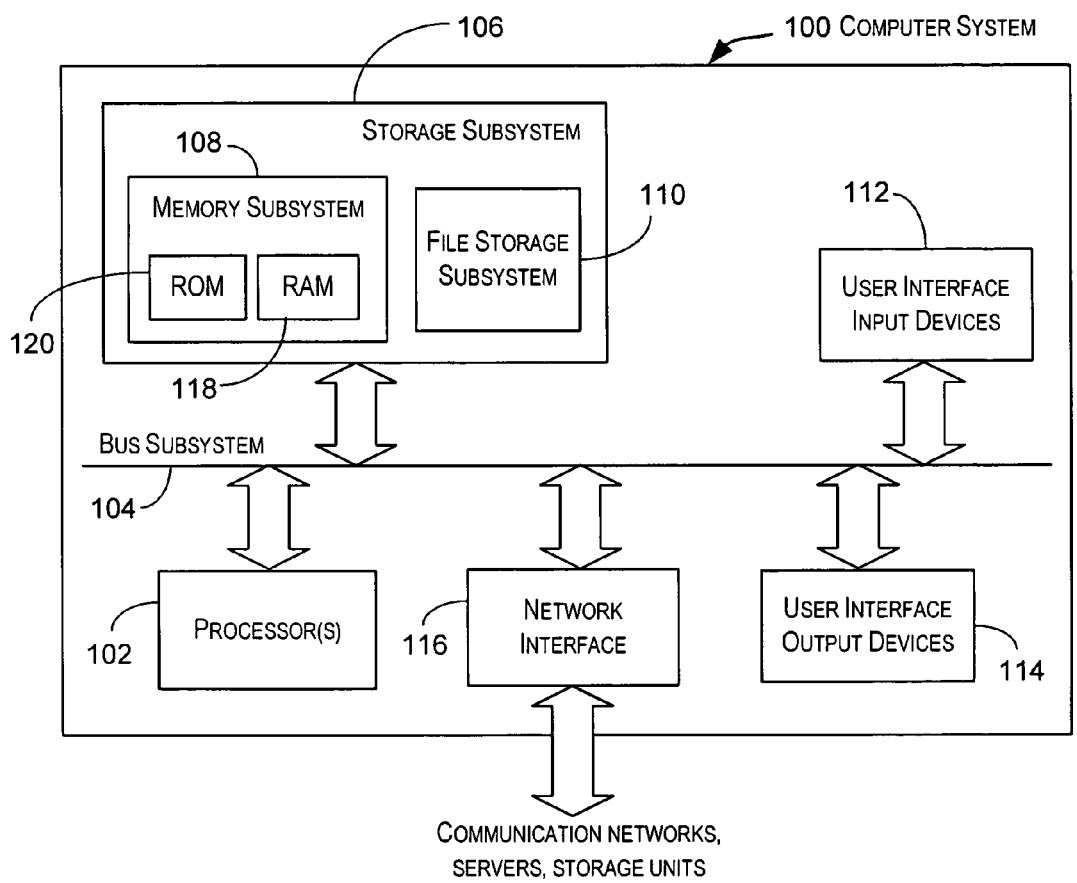
FIG. 1 is a simplified block diagram of a computer system capable of implementing an embodiment of the present invention.

FIG. 1 is a simplified block diagram of a computer system 100 capable of implementing an embodiment of the present invention. As shown in FIG. 1, computer system 100 includes a processor 102 that communicates with a number of peripheral devices via a bus subsystem 104. These peripheral devices may include a storage subsystem 106, comprising a memory subsystem 108 and a file storage subsystem 110, user interface input devices 112, user interface output devices 114, and a network interface subsystem 116. The input and output devices allow a user, such as the administrator, to interact with computer system 100.

Network interface subsystem 116 provides an interface to other computer systems, and networks. Network interface subsystem 116 serves as an interface for receiving data from other sources and for transmitting data to other sources from computer system 100. Embodiments of network interface subsystem 116 include an Ethernet card, a modem (telephone, satellite, cable, ISDN, etc.), (asynchronous) digital subscriber line (DSL) units, and the like.

User interface input devices 112 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and mechanisms for inputting information to computer system 100.

User interface output devices 114 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 100.

Storage subsystem 106 may be configured to store the basic programming and data constructs that provide the functionality of the present invention. For example, according to an embodiment of the present invention, software code modules implementing the functionality of the present invention may be stored in storage subsystem 106. These software modules may be executed by processor(s) 102. Storage subsystem 106 may also provide a repository for storing data used in accordance with the present invention. For example, PTMs encoding the micro-occlusions information may be stored in storage subsystem 106. Storage subsystem 106 may comprise memory subsystem 108 and file/disk storage subsystem 110.

Memory subsystem 108 may include a number of memories including a main random access memory (RAM) 118 for storage of instructions and data during program execution and a read only memory (ROM) 120 in which fixed instructions are stored. File storage subsystem 110 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Bus subsystem 104 provides a mechanism for letting the various components and subsystems of computer system 100 communicate with each other as intended. Although bus subsystem 104 is shown schematically as a single bus, alternative embodiments of the bus subsystem may utilize multiple busses.

Computer system 100 can be of various types including a personal computer, a portable computer, a workstation, a network computer, a mainframe, a kiosk, or any other data processing system. Due to the ever-changing nature of computers and networks, the description of computer system 100 depicted in FIG. 1 is intended only as a specific example for purposes of illustrating the preferred embodiment of the computer system. Many other configurations having more or fewer components than the system depicted in FIG. 1 are possible.

Embodiments of the present invention provide techniques for encoding micro-occlusions information. The techniques pre-generate the micro-occlusions information for a surface (e.g., a surface comprising small scale geometries) and then use mathematical basis functions to encode and store the information in a compressed form. According to an embodiment of the present invention, polynomial texture maps (PTMs) are used to encode and store the micro-occlusions information. PTMs provide an efficient technique for storing the micro-occlusions information in a compressed form that is manageable and does not require extensive memory resources. Further, since PTMs can be evaluated using well-known mathematical techniques, the complexity of processing required for rendering the micro-occlusions information is also reduced.

According to an embodiment of the present invention, a PTM is used to encode micro-occlusion information for an object or surface. The micro-occlusions may be caused by the object itself (i.e., self micro-occlusion) or by another object. Such a PTM may also be referred to as an "occlusion PTM" or "micro-occlusion PTM" as it encodes micro-occlusions information. The resolution of an occlusion PTM may be determined based upon the complexity of the surface to be modeled. According to an embodiment of the present invention, each PTM stores a set of coefficients or values for each pixel of the PTM that encodes micro-occlusion information for the pixel. In this manner, the PTM with its sets of values encodes micro-occlusions information for a surface caused by irradiance sources (e.g., a single white irradiance source) incoming from any direction. During the rendering process, a graphics system is configured to evaluate the sets of coefficients of the PTM for the various pixels to determine the shading to be applied to the pixels based upon local irradiance source color, direction, and intensity properties. The result is a more realistic rendering of the surface including display of micro-occlusions cast onto the surface by the surface geometries or by other geometries. The micro-occlusions are dynamically generated based upon different irradiance conditions. The use of PTMs for representing micro-occlusions uses less storage and computing resources than conventional techniques.

According to one embodiment, each set of coefficients stored in a PTM for a pixel comprises coefficients of a bi-quadric polynomial of the form:

$$A1u^2 + A2u + A3uv + A4v + A5v^2 + A6 = K$$

where

A1, A2, A3, A4, A5, and A6 are floating point coefficients of the polynomial encoding micro-occlusions information for the pixel;

u and v are parameterized projections of the light source vector projected onto a plane perpendicular to the vertex normal of the surface; and K is an occlusion level value that is determined upon evaluating the polynomial.

In the above embodiment, a PTM stores a set of coefficients (e.g., A1, A2, A3, A4, A5, A6) for each pixel of the PTM encoding micro-occlusions information for a surface. A set of coefficients for a pixel thus stores a set of value to be used for evaluating the polynomial to determine the amount of occlusion for the pixel based on the light source vector.

At time of rendering, in order to determine if a particular pixel is occluded or unoccluded, the polynomial function for a pixel is evaluated using the set of coefficients for the pixel and the light source vector (i.e., the direction of the light source), to determine an occlusion level value "K" for the pixel. In one embodiment, the occlusion level value K for a pixel is bounded in [0–1] with 0 indicating no occlusion and 1 indicating full occlusion. Accordingly, if K is evaluated to be 0 it indicates no occlusion for the pixel. If K is evaluated to be 1 it indicates full occlusion for the pixel. In this manner, at the time of displaying the pixels, the sets of coefficients of a PTM are evaluated to determine occlusion level values for the various pixels. Since a set of coefficients is stored for each pixel of the PTM, the PTM can store micro-occlusions information at a per pixel scale. This enables the PTM to encode the fine details of micro-occlusions that could not be efficiently captured by conventional techniques.

The polynomial function described above is intended to be an example of a polynomial that is used to encode micro-occlusions information. It should be apparent that various other forms of polynomials (e.g., of different order, different number of coefficients) may be used in alternative embodiments of the present invention. For example, a polynomial function of the form shown below may also be used.

$$A1u^3+A2v^3+A3u^2v^2+A4u^2v+A5uv^2+A6u^2+A7v^2+A8uv+A9u+A10v+A11=K$$

where

A1, A2, A3, A4, A5, A6, A7, A8, A9, A10, and A11 are floating point coefficients of the polynomial encoding micro-occlusions information for the pixel;

u and v are parameterized projections of the light source vector projected onto a plane perpendicular to the vertex normal of the surface; and K is an occlusion level value that is determined by evaluating the polynomial.

Additionally, other types of mathematical basis functions, besides polynomials, may also be used to encode the micro-occlusions information. These include radial basis functions, Greene's functions, etc.

Figure 2:
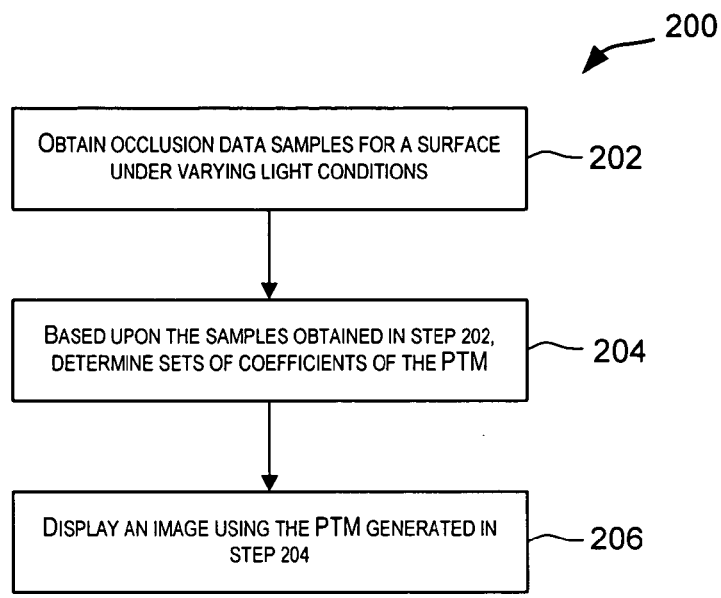
FIG. 2 is a simplified high-level flowchart depicting a method of determining, storing, and using an occlusion PTM for a textured surface according to an embodiment of the present invention.

FIG. 2 is a simplified high-level flowchart 200 depicting a method of determining, storing, and using an occlusion PTM for a textured surface according to an embodiment of the present invention. The processing depicted in each step of FIG. 2 may be performed by software modules executed by a processor, hardware modules, or combinations thereof. Flowchart 200 depicted in FIG. 2 is merely illustrative of an embodiment of the present invention and is not intended to limit the scope of the present invention. Other variations, modifications, and alternatives are also within the scope of the present invention. The method depicted in FIG. 2 may be adapted to work with different implementation constraints.

As depicted in FIG. 2, occlusion data samples are gathered for a surface (e.g., a textured surface) under varying irradiance (light) conditions (step 202). In one embodiment, as part of step 202, a swatch of the textured surface is illuminated by light sources positioned at various angles to the swatch and samples of the swatch are rendered from the same viewpoint. Each rendered sample image stores micro-occlusions information for the swatch texture for a given angle of the light source. Each sample image stores occlusion information indicating if a pixel is either unoccluded (fully lit, white) or occluded (black). Different techniques such as high resolution deep shadow maps, ray tracing, etc. may be used to generate the occlusion samples.

Figure 3:
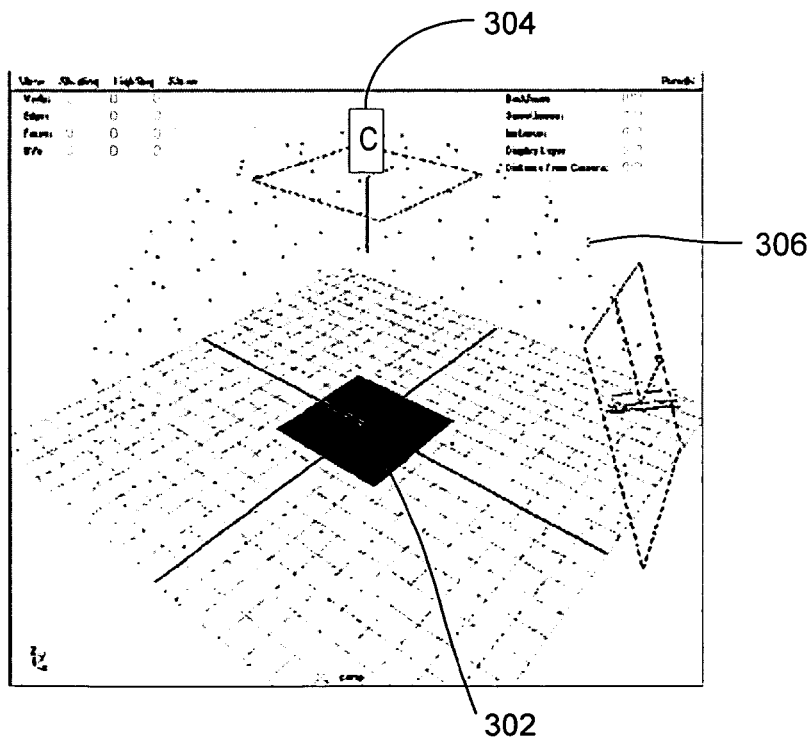
FIG. 3 depicts a configuration that may be used to gather sample occlusion images according to an embodiment of the present invention.

FIG. 3 depicts a configuration that may be used to gather occlusion samples according to an embodiment of the present invention. As shown in FIG. 3, a texture swatch 302 is placed in the center. A render camera 304 is positioned above texture swatch 302 and is used to capture images of texture swatch 302 under varying light conditions. The varying light conditions are provided by illuminating the swatch using a light source from different angles. Dots 306 depicted in FIG. 3 form a uniform dome and represent the various locations where the light source is positioned to provide the varying light conditions. Each light source position represents a different light source vector. According to an embodiment of the present invention, a light source is automatically positioned at the each of the dot locations for capturing the samples. Camera 304 is configured to capture a sample image for each different light vector. Information regarding the position of the light (i.e., the light source vector) for each captured sample image is also stored. In one embodiment, commercially available software such as Maya may be used to capture the occlusion image samples.

The configuration depicted in FIG. 3 may be controlled by the user for any particular application. For example, the user may specify the radius of the hemisphere for the various light locations. The "dots" may be distributed on the hemisphere in a regular or non-regular manner. Generally, a regular even distribution of "dots" is used. The number of light source locations and the number of samples to be taken may be user-defined. The position of the render camera that is used to capture the images may also be set by the user. The parametric projections of the light vector on the plane of the swatch represent the "u" and "v" parameters of the polynomial. The size of the swatch may be controlled by the user. Swatches of different textures and materials may be used.

Figure 4A:
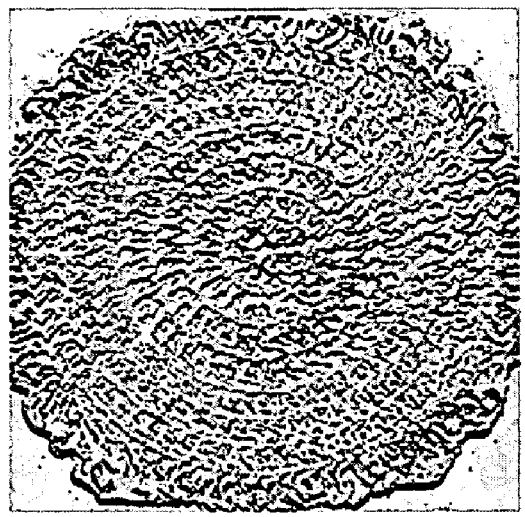
FIGS. 4A and 4B depict examples of occlusion sample images of a knitwear texture captured according to an embodiment of the present invention.
Figure 4B:
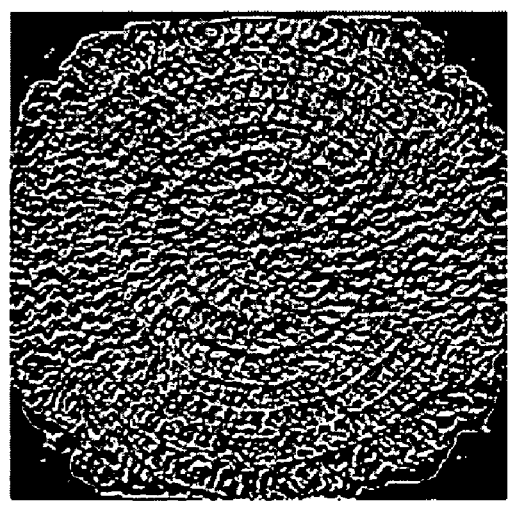

FIGS. 4A and 4B depict examples of occlusion sample images of a knitwear texture where micro occlusions between fibers were recorded (1024×1024 resolution) according to an embodiment of the present invention. As shown, the images store the light micro-occlusion information (white—unoccluded, fully lit; black—occluded, fully self-occluded) that is then used to generate the sets of coefficients for the occlusion PTM. High resolution (4096× 4096) deep shadow maps were used to generate the occlusion samples depicted in FIGS. 4A and 4B. The occlusion images in FIGS. 4A and 4B were captured using increasingly shallow light source angles.

Referring back to FIG. 2, the micro-occlusion data sample images gathered in step 202 are then processed to determine a set of coefficients for each pixel of the textured surface (step 204). The number of coefficients in each set depends on the polynomial chosen for encoding the micro-occlusions information. For example, each set may comprise six coefficients (A1, A2, A3, A4, A5, A6) for a bi-quadratic polynomial. The set of coefficients for each pixel form the PTM representing micro-occlusion information for the swatch. The occlusion PTM thus represents a pre-computed approximation of the per-pixel occlusion under varying light conditions. A PTM, using different forms of polynomials, can also encode illumination functions that can include the results in parts of complex shading and illumination calculations including high frequency self-occlusion or subsurface scattering. As described above, in one embodiment, the function is approximated by a set of six coefficients for each pixel of the texture, which are stored in channels of a texture map.

Various different techniques may be used to determine the coefficients for each pixel. According to an embodiment of the present invention, the samples gathered in step 202 along with information identifying the incident light angles (light vectors, irradiance conditions) that generated the samples are subjected to a mathematical fitting process that derives a set of six coefficients (A1, A2, A3, A4, A5, A6) for each pixel of the textured surface using a least squares fit to a chosen polynomial (can be bi-quadratic, cubic, etc.). Other mathematical techniques known to those skilled in the art may also be used to derive the sets of coefficients in the PTM. Each set of coefficients encodes a polynomial function that tries to dynamically reconstruct the original (light dependent) micro-occlusion function. In a similar manner, sets of six coefficients are derived for the pixels and stored as an occlusion PTM.

Various different techniques may be used for storing the information. According to an embodiment of the present invention, the resulting PTM is stored as a single image (1 image of 6 channels). Other types images may be used to such as in a floating point set of 2 tiff images (2 images of 3 channels) (each coefficient of the polynomial is referred to as a "channel").

The occlusion PTM generated in step 204 represents and encodes the micro-occlusions information and can be used during the rendering process to display the micro-occlusions. PTM encoding of pre-calculated micro-occlusion information, as provided by embodiments of the present invention, requires less storage space than that what would be required to capture such information using high resolution traditional shadow (or deep-shadow) maps The use of PTMs also requires orders of magnitude less memory and processing resources than what would be needed for traditional ray-tracing based techniques.

During the rendering process, a graphics system (e.g., a shader) is configured to render and display an image using the PTM generated in step 204 (step 206). According to an embodiment of the present invention, in order to determine if a particular pixel is occluded or unoccluded, a polynomial is evaluated using coefficients in the set of coefficients corresponding to the pixel in the PTM and using the given light vector (i.e., direction of the light source) to determine a value for K (the occlusion level value). The evaluated value of K then determines if the pixel is occluded or not. In one embodiment, if K is evaluated to be 0 it indicates no occlusion for the pixel. If K is evaluated to be 1 it indicates full occlusion for the pixel. In this manner, in step 206, the sets of coefficients of a PTM are evaluated to determine occlusion level values for the various pixels. The image is then rendered and displayed based upon the determined occlusion level values.

Since evaluation of the polynomial for each pixel involves a limited number of multiplications and additions, the occlusion PTM can be evaluated in an efficient manner using less processing resources than conventional techniques used for representing micro-occlusions.

In one embodiment, the occlusion PTM information is read by a surface shader. The surface shader reads the polynomial coefficients from the occlusion PTM for each pixel and communicates the coefficients to a light shader. The light shader may also receive various other inputs such as other texture maps information, macro-scale occlusions, bending effects information, buckling effects information, fog effects, etc. in addition to the occlusion PTM information. Based upon the various inputs, the light shader determines and outputs a light intensity value for each pixel which represents the illumination model for the pixel. The illumination model for the pixel represents the compounded effect of the different inputs to the light shader including micro-scale occlusions using occlusion PTMs. The illumination model for each pixel is then used to display the pixel. In this manner, an image is displayed that displays micro-scale occlusions.

Figure 5A:
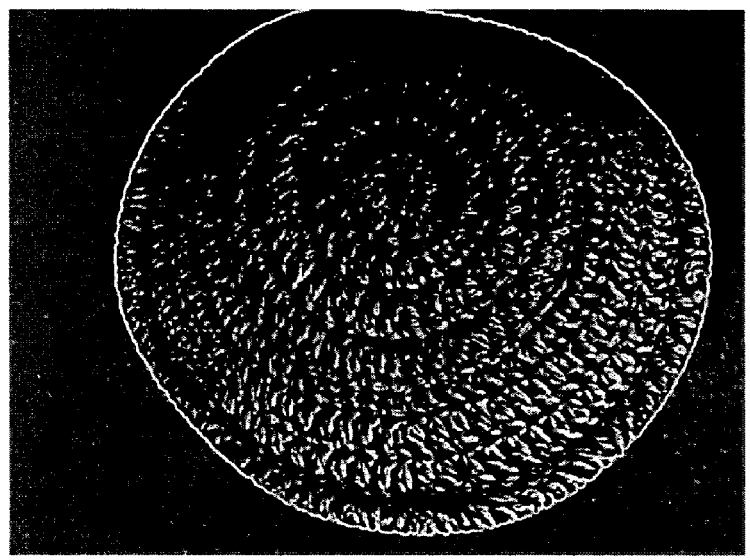
FIGS. 5A and 5B depict examples of texture images displayed using an occlusion PTM according to an embodiment of the present invention.
Figure 5B:
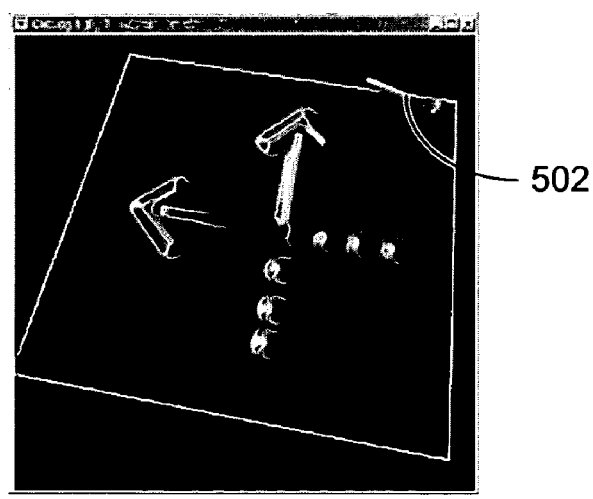

FIG. 5A depicts an example of a complex weave texture image displayed using an occlusion PTM according to an embodiment of the present invention. In the embodiment depicted in FIG. 5B, the light source is positioned at approximately a 45 degree angle above the object from the bottom side of the image. FIG. 5B depicts an example of another image displayed using an occlusion PTM according to an embodiment of the present invention. Arrow 502 in FIG. 5B represents the direction of the incident light. As the direction of the light source changes, the shadows and occlusions also rotate dynamically in response to the light source position. The use of occlusion PTMs thus allows for enhanced light interaction and dynamic generation of micro-occlusions.

Figure 6:
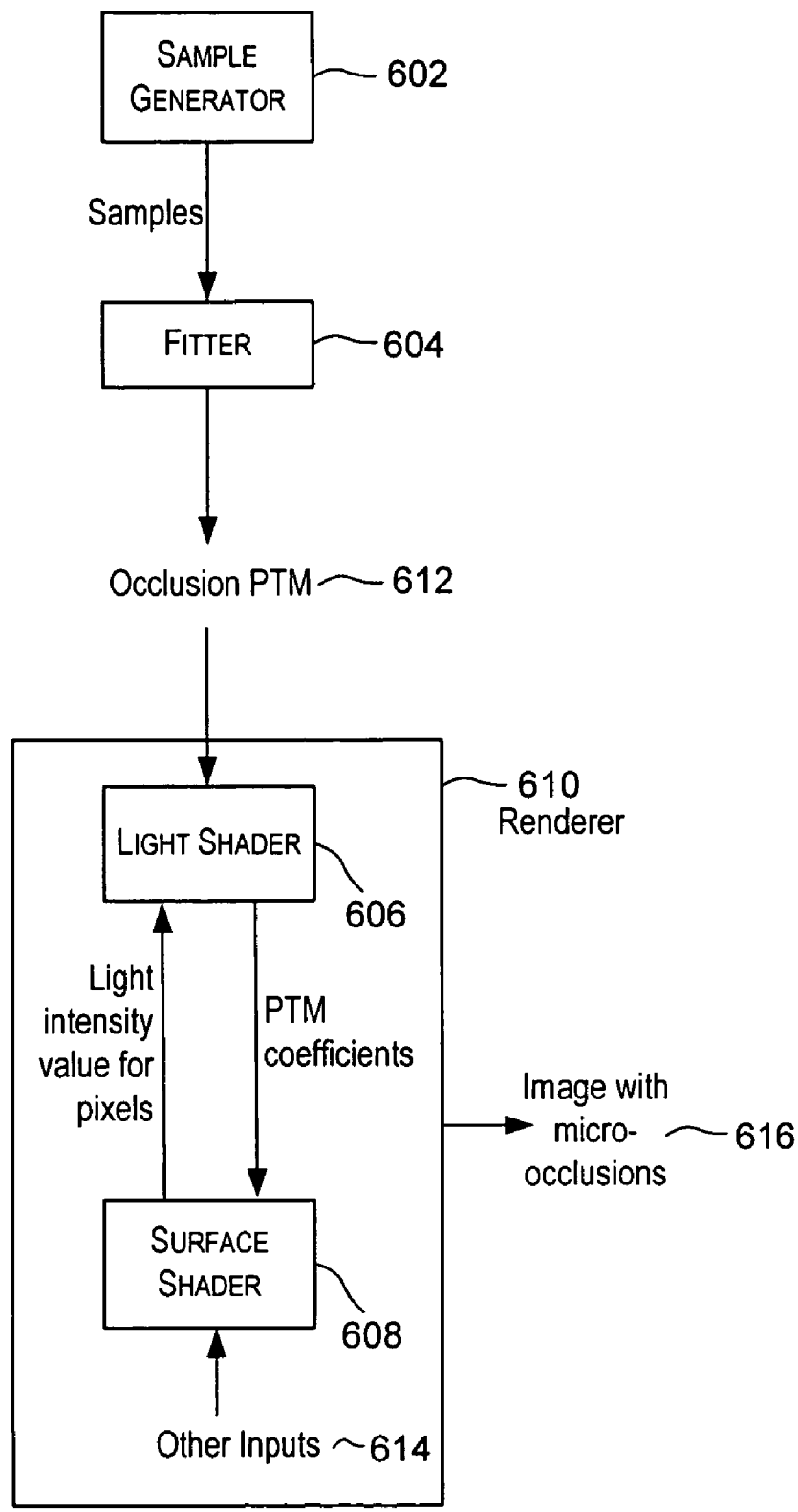
FIG. 6 is simplified block diagram of modules that may be used to implement an embodiment of the present invention.

FIG. 6 is simplified block diagram of modules that may be used to implement an embodiment of the present invention. The modules depicted in FIG. 6 may be software modules, hardware modules, or combinations thereof. These modules include a sample generator module 602, a fitter module 604, a surface shader module 606, and a light shader module 608. Many other configurations having more or fewer modules than the ones depicted in FIG. 1 are possible in alternative embodiments of the present invention.

Sample generator module 602 is configured to generate occlusion samples for a surface under varying irradiance (light) conditions. As previously described, different configurations and set ups may be used to generate the samples. The samples generated by sample generator module 602 are then passed to a fitter module 604 that is configured to perform mathematical processing on the samples and generate an occlusion PTM that encodes micro-scale occlusions information. Fitter 604 may use different mathematical fitting processes to generate occlusion PTM 612.

Occlusion PTM 612 may then be used by a renderer 610 to display an image. In one embodiment, as depicted in FIG. 6, the occlusion PTM coefficients are read by surface shader module 606 that communicates the coefficients to a light shader module 608. Light shader 608 may also receive various other inputs 614 such as texture maps, bending effects information, buckling effects information, fog effects, etc. in addition to the occlusion PTM information. Based upon the various inputs, light shader 608 is configured to determine and output a light intensity value for each pixel that represents the illumination model for the pixel. The illumination model for the pixel represents the compounded effect of the different inputs to the light shader including micro-scale occlusions using occlusion PTMs. The illumination model for each pixel is then passed back to surface shader 606 and is used to display the pixel. In this manner, an image 616 that include micro-scale occlusions is displayed.

PTMs are presently used in the computer graphics imaging field for storing Bidirectional Reflection Distribution Function (BRDF) information, for example, for storing surface color information for an object under varying light conditions. In such implementations, each PTM stores sets of coefficients that encode color information. The BRDF information is then retrieved by graphics hardware. However, PTMs have not been used to store exclusively micro-occlusions information. As described above, according to the teachings of the present invention, instead of storing BRDF information, PTMs are used to encode and store only micro-occlusions information. A PTM thus provides an efficient and compressed technique for storing micro-occlusions information. The micro-occlusions information stored by an occlusion PTM can then be used efficiently to dynamically render and display materials more accurately.

Since the PTM stores only micro-occlusions information, the representation of the micro-occlusion information is independent of the representations of the illumination model. The micro-occlusions information encoded in an occlusion PTM may be in conjunction with any illumination models when an image is displayed. As a result of the independence from illumination models, a micro-occlusions information PTM can be used with various different illumination models, with differing complexities based upon the application, to display the image. A graphics system is thus free to choose the illumination model and then use occlusion PTMs in conjunction with the selected illumination model. Illumination models may thus be complemented with previously unavailable micro-scale occlusions information encoded by the occlusion PTMs.

According to an embodiment of the present invention, the micro-occlusions information encoded by an occlusion PTM may also be used to render repeatable or tileable patterns. If a surface texture pattern is tileable, then the occlusion samples generated for the pattern take into account bordering iterations of the pattern. In this embodiment, when the occlusion samples are rendered, a section of tiles (e.g., 9 tiles of 3×3) of the pattern are represented. The rendering camera only renders the central pattern and the surrounding occlusion patterns are generated based upon the central pattern such that the borders between the tiles is seamless. A PTM generated from such samples also encodes the information and is thus tileable. The PTM encodes the tileable occlusion nature of the texture and the micro-occlusions information encoded by the PTM is tileable. Using occlusion PTMs may be used for rendering various patterns and is particular useful when applied to cloth weave patterns.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof. For example, the processing performed by the present invention, as described above, may be implemented in hardware chips, graphics boards or accelerators, etc.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method of storing a texture map encoding micro-occlusions information for a surface, the method comprising:

determining a plurality of sets of values, each set of values in the plurality including values corresponding to coefficients of a polynomial function that yields an occlusion value based upon a light direction, the plurality of sets of values encoding information for micro-occlusions for the surface under varying irradiance conditions; and storing the plurality of sets of values as a texture map.

2. The method of claim 1 further comprising:

obtaining a plurality of samples of the surface using a plurality of irradiant conditions, each sample depicting micro-occlusion information for the surface for a particular irradiant condition from the plurality of irradiant conditions; and wherein determining the plurality of sets of values comprises determining the plurality of sets of values based upon the plurality of samples obtained for the surface.

3. The method of claim 2 wherein determining the plurality of sets of values based upon the plurality of samples comprises using a mathematical fitting process to determine the values for the plurality of sets of values.

4. The method of claim 1 further comprising:

displaying a rendered image of the surface using the texture map, the rendered image displaying one or more micro-occlusions.

5. The method of claim 1 further comprising:

receiving information identifying a light source direction;

determining an occlusion value for each set of values in the plurality of sets of values of the texture map, the occlusion value for each set of values determined based upon the values in the set of values and the light source direction; and displaying an image based upon the determined occlusion values for the plurality of sets of values in the texture map.

6. The method of claim 5 wherein determining the occlusion value for each set of values in the plurality of set of values of the texture map comprises evaluating the polynomial function using the values in the set of values and the light source direction.

7. The method of claim 1 wherein the polynomial function is $$A1u^2+A2u+A3uv+A4v+A5v^2+A6$$

where

A1, A2, A3, A4, A5, and A6 are coefficients of the polynomial function encoding micro-occlusion information, and u and v are parameterized projections of a light source vector.

8. The method of claim 7 wherein determining the occlusion value for each set of values in the plurality of set of values of the texture map comprises evaluating the polynomial function using the values in the set of values and the light source direction.

9. The method of claim 1 wherein the polynomial function is $$A1u^3+A2v^3+A3u^2v^2+A4u^2v+A5uv^2+A6u^2+A7v^2+A8uv+A9u+A10v+A11$$

where
A1, A2, A3, A4, A5, A6, A7, A8, A9, A10, and A11 are coefficients of the polynomial function encoding micro-occlusion information, and
u and v are parameterized projections of a light source vector.

10. A computer program product stored on a computer-readable medium for storing a texture map encoding micro-occlusions information for a surface, the computer program product comprising:
code for determining a plurality of sets of values, each set of values in the plurality including values corresponding to coefficients of a polynomial function that yields an occlusion value based upon a light direction, the plurality of sets of values encoding information for micro-occlusions for the surface under varying irradiance conditions; and
code for storing the plurality of sets of values as a texture map.

11. The computer program product of claim 10 further comprising:
code for obtaining a plurality of samples of the surface using a plurality of irradiant conditions, each sample depicting micro-occlusion information for the surface for a particular irradiant condition from the plurality of irradiant conditions; and
wherein the code for determining the plurality of sets of values comprises code for determining the plurality of sets of values based upon the plurality of samples obtained for the surface.

12. The computer program product of claim 11 wherein the code for determining the plurality of sets of values based upon the plurality of samples comprises code for using a mathematical fitting process to determine the values for the plurality of sets of values.

13. The computer program product of claim 10 further comprising:
code for displaying a rendered image of the surface using the texture map, the rendered image displaying one or more micro-occlusions.

14. The computer program product of claim 10 further comprising:
code for receiving information identifying a light source direction;
code for determining an occlusion value for each set of values in the plurality of sets of values of the texture map, the occlusion value for each set of values determined based upon the values in the set of values and the light source direction; and
code for displaying an image based upon the determined occlusion values for the plurality of sets of values in the texture map.

15. The computer program product of claim 14 wherein the code for determining the occlusion value for each set of values in the plurality of set of values of the texture map comprises code for evaluating the polynomial function using the values in the set of values and the light source direction.

16. The computer program product of claim 10 wherein the polynomial function is $$A1u^2+A2u+A3uv+A4v+A5v^2+A6$$

where
A1, A2, A3, A4, A5, and A6 are coefficients of the polynomial function encoding micro-occlusion information, and
u and v are parameterized projections of a light source vector.

17. The computer program product of claim 16 wherein the code for determining the occlusion value for each set of values in the plurality of set of values of the texture map comprises code for evaluating the polynomial function using the values in the set of values and the light source direction.

18. The computer program product of claim 10 wherein the polynomial function is $$A1u^3+A2v^3+A3u^2v^2+A4u^2v+A5^{uv^2}+A6u^2A7v^2+A8uv+A9u+A10v+A11$$

where
A1, A2, A3, A4, A5, A6, A7, A8, A9, A10, and A11 are coefficients of the polynomial function encoding micro-occlusion information, and
u and v are parameterized projections of a light source vector.

19. A computer system for storing a texture map encoding micro-occlusions information for a surface, the system comprising:
a processor; and
a memory coupled to the processor, the memory configured to store a plurality of instructions executable by the processor, the plurality of instructions comprising:
instructions for determining a plurality of sets of values, each set of values in the plurality including values corresponding to coefficients of a polynomial function that yields an occlusion value based upon a light direction, the plurality of sets of values encoding information for micro-occlusions for the surface under varying irradiance conditions; and
instructions for storing the plurality of sets of values as a texture map.

20. The system of claim 19 wherein the plurality of instructions further comprises:
instructions for obtaining a plurality of samples of the surface using a plurality of irradiant conditions, each sample depicting micro-occlusion information for the surface for a particular irradiant condition from the plurality of irradiant conditions; and
wherein the instructions for determining the plurality of sets of values comprise instructions for determining the plurality of sets of values based upon the plurality of samples obtained for the surface.

21. The system of claim 20 wherein the instructions for determining the plurality of sets of values based upon the plurality of samples comprise instructions for using a mathematical fitting process to determine the values for the plurality of sets of values.

22. The system of claim 19 wherein the plurality of instructions further comprises:
instructions for displaying a rendered image of the surface using the texture map, the rendered image displaying one or more micro-occlusions.

23. The system of claim 19 wherein the plurality of instructions further comprises:
instructions for receiving information identifying a light source direction;

instructions for determining an occlusion value for each set of values in the plurality of sets of values of the texture map, the occlusion value for each set of values determined based upon the values in the set of values and the light source direction; and instructions for displaying an image based upon the determined occlusion values for the plurality of sets of values in the texture map.

24. The system of claim 23 wherein the instructions for determining the occlusion value for each set of values in the plurality of set of values of the texture map comprise instructions for evaluating the polynomial function using the values in the set of values and the light source direction.

25. The system of claim 19 wherein the polynomial function is $$A1u^2+A2u+A3uv+A4v+A5v^2+A6$$

where

A1, A2, A3, A4, A5, and A6 are coefficients of the polynomial function encoding micro-occlusion information, and u and v are parameterized projections of a light source vector.

26. The system of claim 25 wherein the instructions for determining the occlusion value for each set of values in the plurality of set of values of the texture map comprise instructions for evaluating the polynomial function using the values in the set of values and the light source direction.

27. The system of claim 19 wherein the polynomial function is $$A1u3+A2v3+A3u2v2+A4u2v+A5uv2+A6u2+A7v2+A8uv+A9u+A10v+A11$$

where

A1, A2, A3, A4, A5, A6, A7, A8, A9, A10, and A11 are coefficients of the polynomial function encoding micro-occlusion information, and u and v are parameterized projections of a light source vector.

* * * * *

UNITED STATES PATENT AND TRADEMARK OFFICE
CERTIFICATE OF CORRECTION

PATENT NO.       : 7,012,615 B2
APPLICATION NO. : 10/778582
DATED            : March 14, 2006
INVENTOR(S)      : Manuel Kraemer It is certified that error appears in the above-identified patent and that said Letters Patent is hereby corrected as shown below:

In the Claims:

Column 12, Line 18, please delete "$A1u^3 + A2v^3 + A3u^2v^2 + A4u^2v + A5^{uv2} + A6u^2 A7v^2+$" and insert --$A1u^3 + A2v^3 + A3u^2v^2 + A4u^2v + A5uv^2 + A6u^2 + A7v^2+$--.

Column 13, Line 16, please delete "$A1u^2 + A2u + A3uv + A4v + A5^{v2} + A6$" and insert -- $A1u^2 + A2u + A3uv + A4v + A5v^2 + A6$--.

Column 14, Line 10, please delete "$A1u\ 3 + A2v3 + A3u2v2 + A4u2v + A5uv2 + A6u2 + A7v2+$" and insert --$A1u^3 + A2v^3 + A3u^2v^2 + A4u^2v + A5uv^2 + A6u^2 + A7v^2+$--.

Signed and Sealed this

Fifth Day of September, 2006

JON W. DUDAS
*Director of the United States Patent and Trademark Office*